United States Patent
Biemelt et al.

[11] Patent Number: 5,915,349
[45] Date of Patent: Jun. 29, 1999

[54] GASOLINE INTERNAL COMBUSTION ENGINE

[75] Inventors: Andreas Biemelt, Schwaikheim; Peter Hohner, Leinfelden-Echterdingen; Karl Günter; Helmut Schorn, both of Esslingen, all of Germany

[73] Assignee: Daimler-Benz AG, Stuttgart, Germany

[21] Appl. No.: 09/027,803

[22] Filed: Feb. 23, 1998

[30] Foreign Application Priority Data

Feb. 28, 1997 [DE] Germany .............. 197 08 154

[51] Int. Cl.$^6$ ........................................ F02P 15/04
[52] U.S. Cl. ............................... 123/162; 123/305
[58] Field of Search ....................... 123/162, 294, 123/298, 305

[56] References Cited

U.S. PATENT DOCUMENTS

| | | |
|---|---|---|
| 4,774,914 | 10/1988 | Ward . |
| 4,848,287 | 7/1989 | Gillbrand et al. . |
| 5,503,133 | 4/1996 | Trigger . |
| 5,590,629 | 1/1997 | Codina et al. . |

FOREIGN PATENT DOCUMENTS

| | | | |
|---|---|---|---|
| 216243 | 7/1958 | Australia ................. | 123/162 |
| 633 611 | 7/1936 | Germany . | |
| 573284 | 2/1958 | Italy .................... | 123/162 |
| 1 560 832 | 2/1980 | United Kingdom . | |
| 2 233 390 | 1/1991 | United Kingdom . | |
| 2 295 204 | 5/1996 | United Kingdom . | |
| WO 87/07682 | 12/1987 | WIPO . | |
| WO 96/13660 | 5/1996 | WIPO . | |

*Primary Examiner*—Noah P. Kamen
*Attorney, Agent, or Firm*—Klaus J. Bach

[57] ABSTRACT

In a gasoline internal combustion engine with direct fuel injection a spark plug with a center electrode is mounted in the cylinder top so as to project into the combustion chamber. A mass electrode is disposed on the piston so as to project upwardly into the combustion chamber and is movable with the piston toward and from the spark plug center electrode. An ignition system is provided for timely generating a spark between the spark plug electrode and the movable mass electrode for igniting a fuel/air mixture in the combustion chamber. A fuel injector is mounted in the cylinder top and adapted to provide a cone-like fuel beam with an envelope disposed between the spark plug electrode and the mass electrode such that a spark generated between the two electrodes extends through the fuel injection beam envelope.

14 Claims, 3 Drawing Sheets

GASOLINE INTERNAL COMBUSTION ENGINE

BACKGROUND OF THE INVENTION

The invention relates to a gasoline internal combustion engine with direct fuel injection into a combustion chamber delimited by a piston top wall. The piston top wall includes a mass electrode movable with the piston toward, and away from, a center electrode. The center electrode extends into the combustion chamber for generating a spark between the center electrode and the mass electrode for igniting the fuel/air mixture generated in the combustion chamber.

Internal combustion engines are generally operated by the combustion of a fuel/air mixture provided in the combustion chambers of the internal combustion engine. The combustion chambers are delimited by pistons longitudinally movably disposed in the engine cylinders. After compression of the fuel/air mixture in a cylinder by the respective piston, combustion is initiated by an electric spark, which is generated between two electrodes extending into the combustion chamber. The ignition voltage is produced by an ignition system and is applied to the electrodes of the spark plug. Provided the fuel/air mixture volume in which the ignition spark is generated is ignitable, that is the mixture composition is within the ignition limits around the stoichiometric point, the mixture volume around the spark will be ignited. The flame so generated ignites the rest of the mixture in the combustion chamber, that is, it initiates the combustion of the fuel starting from the point of ignition thereby increasing the pressure and driving the piston. For a complete combustion of the fuel, which is desirable for achieving maximum engine power output, efficient engine operations and low engine emissions, optimal ignition conditions are necessary. Such conditions are promoted by an easy access of the mixture to the ignition spark (ignition system), by a relatively long spark duration and by a large spark length, that is, a large gap between the electrodes where the spark is generated.

It is possible to provide a variable distance between the electrodes by arranging the center electrode of a spark plug at a particular location within the combustion chamber and provide the mass electrode as a projection extending from the piston top wall. Such a mass electrode is movable with the piston toward and from the center electrode. Depending on the position in the cylinder at the time of ignition, the distance of the mass electrode from the center electrode is different so that different spark lengths are possible. Such an internal combustion engine is known, for example, from WO 87/07682. The engine includes an apparatus for determining the momentary engine load at a particular engine speed. The apparatus assigns a particular ignition time to each operating point of the internal combustion engine. At this particular ignition time, an ignition system generates an ignition voltage between the pair of electrodes of the respective cylinder.

In the lower partial load range of the internal combustion engine ignition occurs at an earlier point in time that is at piston positions clearly before the piston is at the top dead center. In this load range of the internal combustion engine in which the fuel/air mixture is relatively lean, ignition and combustion by means of the two-part electrode arrangement is facilitated at the same time by two factors: 1. the combustion period is relatively long because of the early ignition and, 2. the spark is relatively long since, at the relatively early ignition point, the mass electrode on the piston is still at a relatively large distance from the center electrode. With increasing engine load and increasing engine speed, ignition occurs increasingly later during the compression stroke of the piston. As a result, the mixture is combusted with a combustion pressure suitable for the load of the internal combustion engine. As the piston approaches the top dead center position, also the distance between the electrodes at the time of ignition becomes smaller. The voltage requirements for initiating an ignition spark increases with the engine load, that is, with the combustion chamber pressure. But the voltage requirements decrease when the distance between the electrodes becomes smaller. The voltage requirements remain therefore essentially the same over the whole performance graph range of the engine. As a result, the ignition system needs to provide different ignition voltages only within narrow limits.

However, particularly during partial load operation of the known internal combustion engine, the combustion in some cylinders may be incomplete or the mixture may even fail to be ignited. Ignition occurs sequentially and at equivalent ignition timing for all the cylinders; however, the condition and the stoichiometric composition of the fuel/air mixture supplied to the various combustion chambers may differ. Accordingly, at a particular operating point, some cylinders may have an excessively lean mixture such that the mixture in the particular cylinder cannot ignite.

It is the object of the present invention to provide a gasoline engine wherein a complete combustion is obtained in each cylinder at any engine operating state.

SUMMARY OF THE INVENTION

In a gasoline internal combustion engine with direct fuel injection, a spark plug with a center electrode is mounted in the cylinder top so as to project into the combustion chamber. A mass electrode is disposed on the piston so as to project upwardly into the combustion chamber and is movable with the piston toward and from the spark plug center electrode. An ignition system is provided for timely generating a spark between the spark plug electrode and the movable mass electrode for igniting a fuel/air mixture in the combustion chamber. A fuel injector is mounted in the cylinder top and adapted to provide a cone-like fuel beam with an envelope disposed between the spark plug electrode and the mass electrode such that a spark generated between the two electrodes extends through the fuel injection beam envelope.

A mixture is formed in the combustion chambers of internal combustion engines by direct fuel injection into the combustion chambers for mixture with the air admitted through an intake valve. This facilitates uniform dosing of the mixture by composition and amounts in all cylinders for providing an ignitable fuel/air mixture. The same fuel amounts in all the cylinders with equivalent ignition timing provide for uniform combustion conditions.

Direct fuel injection facilitates stratification of the fuel/air mixture with different air ratios. The stratified charge operation is particularly advantageous during partial load operation of the internal combustion engine since the fuel amount injected is utilized for satisfying the relatively small power output requirements by forming a limited mixture cloud with an ignitable fuel/air mixture ratio. A large part of the combustion chamber is filled in this case with a lean mixture or with pure air so that the fuel consumption of the internal combustion engine under such operating conditions is relatively low.

With a variable spark length achieved by the movable mass electrode on the piston, the stratified charge fuel/air mixture can be safely ignited. Particularly during partial load operation with a correspondingly low fuel dose per operating cycle the large spark length obtained with the early ignition timing provides for optimal ignition and good mixture combustion. In its long travel path between the center electrode and the mass electrode, the ignition spark passes through a large section of the stratified charge cloud in the combustion chamber and consequently through partial mixture volume with different air conditions. In this way, the ignition spark comes in contact with at least some partial volume including an ignitable fuel/air mixture, which is ignited and causes ignition of the rest of the stratified charge volume on a wide front. With good internal mixture formation and particularly with stratified charge operation by direct fuel injection during the compression stroke of the engine, uniformly good ignition and combustion conditions are achieved. Particularly helpful in this regard is the electrode arrangement described herein in which the electrode gap is variable depending on the piston position at the time of ignition.

Preferably, the fuel injector is arranged centrally in the combustion chamber and its fuel injection beam is directed toward the piston top wall whereby a central mixture cloud is formed with the combustion air. This arrangement prevents the deposition of fuel on the wall of the combustion chamber which would cause incomplete combustion with increased hydrocarbon emission values. Preferably the injector includes an injection nozzle providing for a symmetrical cone-shaped fuel beam in the combustion chamber. In this way, a stratified charge with a low air/fuel ratio, that is, with a rich mixture in the center of the core-shaped beam and positive air/fuel ratio gradients toward the cone envelope can be established in a stable manner. The mixture cloud formed in the center of the cone-shaped beam is safely ignitable with the arrangement according to the invention in which the center electrode is disposed outside the cone-shaped fuel beam and the mass electrode is disposed within the cone-shaped fuel beam. The ignition spark formed between the electrodes passes through the beam envelope and consequently, through sections of the cone-shaped mixture cloud which have different. As a result, it also passes through partial volumes within the beam envelope which are readily ignitable and which are ignited and cause the combustion of the rest of the combustion chamber charge.

The ignition system is preferably an alternating current ignition system which can provide ignition voltages transformed sufficiently high to generate long sparks and which, if desired, can provide a long spark duration or several ignition pulses. The ignition voltage applied by the ignition system as well as the spark duration and particularly the ignition timing may be determined by a performance graph control in dependence on at least one operating parameter of the internal combustion engine. The ignition and combustion conditions in the combustion chambers of the internal combustion engine are improved in this way in an operating point-specific manner. This is possible because, with the selection of the suitable ignition timing point and accordingly the corresponding spark lengths which depend on the distances of the electrodes, ignition sparks can be generated which satisfy the high requirements particularly under partial engine load operating conditions.

Embodiments of the invention will be described below on the basis of the accompanying drawings.

DESCRIPTION OF THE PREFERRED EMBODIMENTS

Figure 1:
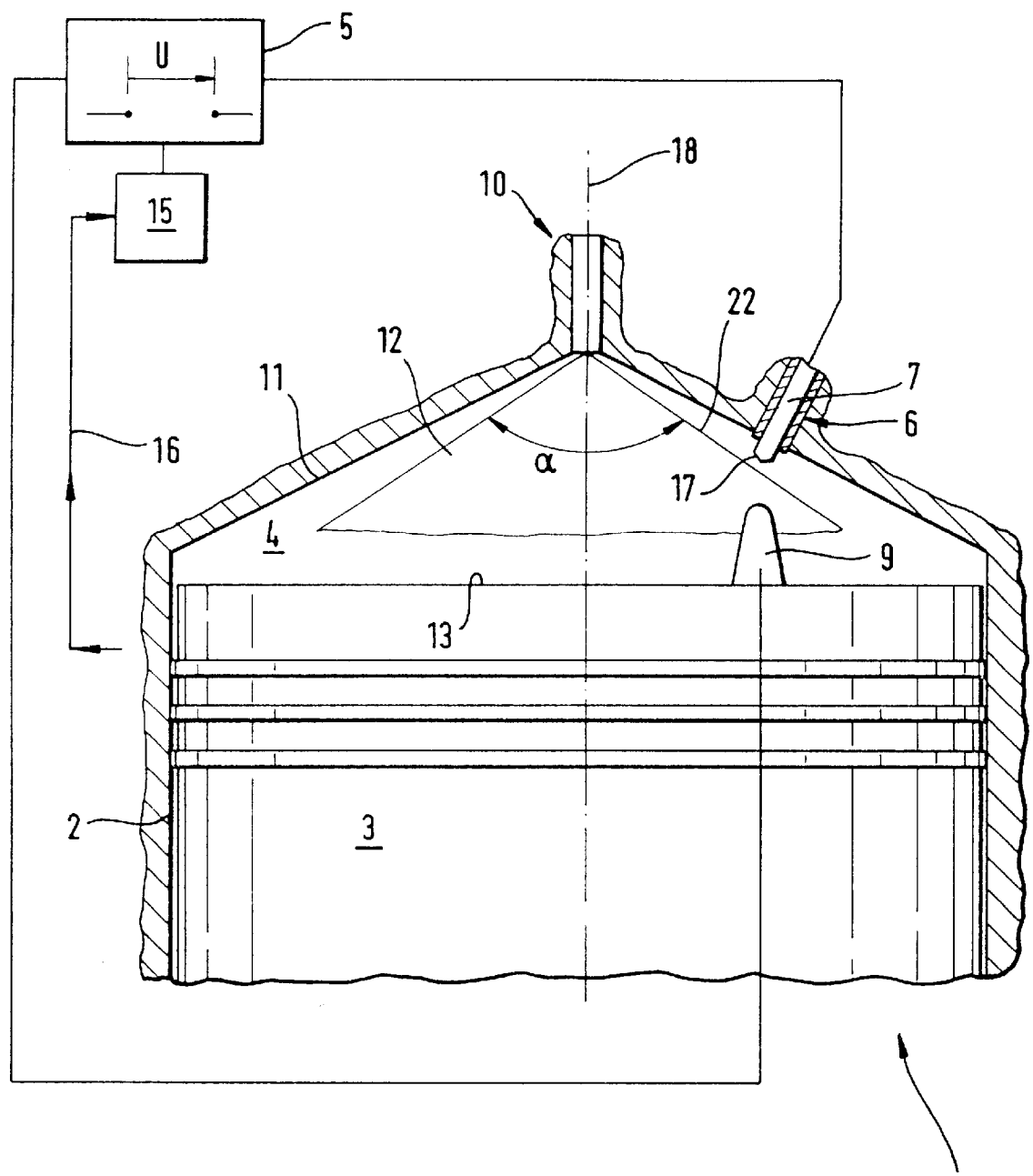
FIG. 1 is a schematic axial cross-section view of a cylinder of a gasoline engine.

As shown in FIG. 1, a cylinder 2 of a gasoline engine 1 includes a longitudinally movable piston 3, which delimits a combustion chamber 4. An injector 10 is disposed in the combustion chamber top wall 11 on the center axis 18 of the cylinder so as to inject fuel into the combustion chamber 4 in a conical beam 12 opening toward the piston top wall 13. While fuel is injected into the combustion chamber 4 during the compression stroke of the piston 3, a stratified combustion chamber charge is formed with the combustion air, which is supplied to the combustion chamber 4 in a conventional way through one or more intake valves. During stratified charge operation of the internal combustion engine 1, the fuel cone 12 provides for a stratified central mixture cloud with a beam envelope 22 with an increasing air/fuel ratio $\lambda$ that is an increasingly lean mixture.

After the formation of the mixture, the combustion in the combustion chamber 4 is initiated by an ignition spark which is generated in the mixture-filled chamber between two electrodes 7, 9. The ignition voltage which is required for the ignition and which generates a spark discharge between the electrodes is supplied by an alternating current ignition system 5. The electrodes 7, 9 are mechanically separated components. The center electrode 7 is part of a spark plug 6, which is firmly mounted into the combustion chamber top 11. The mass electrode 9 is part of the piston 3 and projects from the piston top 13 into the combustion chamber 4. In gasoline engines, the ignition is generally initiated during the compression stroke of the piston 3 wherein, with such an arrangement of the electrodes 7, 9, the piston 3 moves the mass electrode toward the center electrode 7. For each ignition timing point, there is therefore a particular piston position and accordingly a particular distance between the electrodes 7, 9 as predetermined by the geometry of the arrangement, the distance between the electrodes 7, 9 defining the spark length. The electrodes 7, 9 extend into the combustion chamber 4 in such a way that the center electrode 7 is disposed outside the conical fuel beam 12 and the mass electrode 9 is disposed within. When a spark is generated between the electrodes 7, 9, it passes through the beam envelope 22 and through mixture layers with different $\lambda$ values. The volume parts of the beam envelope 22, which have air values for ignitable mixtures are ignited thereby and ignite the rest of the mixture. The spark plug 6 with the center electrode 7 and the mass electrode 9 are arranged relative to each other in such a way that the beam envelope 22 is always between the free end of the center electrode 7 and the mass electrode 9 for any variation in the opening angle $\alpha$ of the conical fuel beam 12. Tolerances in the manufacture of the injectors 10 in the different cylinders of the internal combustion engine 1 may be the cause of such variation in the opening angle $\alpha$ of the various conical fuel beams 12. A certain tolerance range has to be taken into consideration, but the ignition spark is sufficiently long that the ignition of the mixture is insured.

The combustion chamber top 11 is conically shaped and symmetrical with respect to the cylinder axis 18. It has an opening angle which is somewhat greater than the maximum opening angle α of the conical fuel beam 12 which extends from the apex of combustion chamber top 11. The center electrode 7 extends into the gap formed in the combustion chamber 4 between the beam envelope 22 and the combustion chamber top 11. The free end of the center electrode 7 is disposed adjacent the fuel beam envelope 22. Wetting of the center electrode 7 by liquid fuel is therefore prevented. The spark plug 6 end particularly an insulator surrounding the center electrode 7 are therefore not subjected to high thermal stress reversals by fuel burning on the surface of the center electrode 7 and the spark plug is accordingly not subject to the high wear caused thereby.

The spark plug 6 is arranged in the combustion chamber top 11 at a distance from the injector 10 such that, during the ignition which occurs always after the end of the injection procedure, the fuel first injected is first burnt. It is prevented in this way that the fuel first injected into the combustion chamber 4 is too widely distributed in the combustion chamber 4, whereby a lean mixture could be formed, which would not easily ignite. A uniform combustion of the ignitable mixture cloud in the center of the combustion chamber 4 is therefore insured.

In order to achieve a complete combustion at all operating points of the internal combustion engine 1 and under all the various combustion conditions in the combustion chamber 4, a specific ignition point is assigned to each engine operating point. With a relatively low operating load, ignition occurs relatively early, that is at a piston position noticeably before the piston reaches the upper dead center position. Consequently, at the time of ignition, there is a relatively large gap between the center electrode 7 and the mass electrode 9 on the piston top 13. With increasing operating load of the internal combustion engine ignition of the mixture is increasingly retarded to a piston position closer to the cylinder top 11 and a smaller gap between the ignition electrodes 7, 9. The ignition voltage required for establishing a spark increases with increasing combustion chamber pressure and decreases with decreasing electrode gap. As a result, with the movable mass electrode 9, the required ignition voltage remains about the same for all operating conditions since ignition timing is relatively late when the combustion chamber pressure is high and it is relatively early when the combustion chamber pressure is relatively low. As a result, a safe and spontaneous ignition of the mixture is always achieved. The most suitable ignition timing for a particular engine operating point of the internal combustion engine is determined by a performance graph control 15, which includes in its memory the most suitable ignition timing points for all the engine operating conditions. Based on engine operating parameters 16 of the engine 1, which are continuously provided, the performance graph control 15 controls the alternating current ignition system 5 and initiates the application of an ignition voltage to the electrodes 7, 9 at the most suitable ignition timing points.

Figure 2:
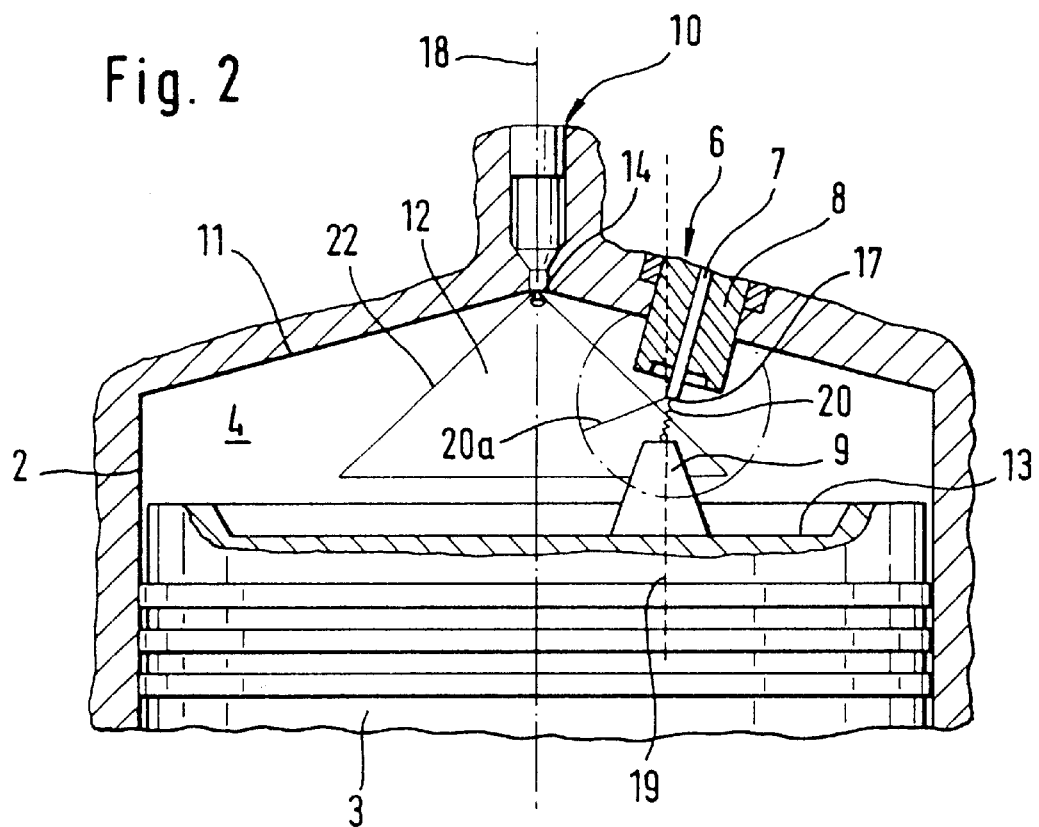
FIGS. 2 and 3 show schematically two different arrangements for the ignition electrodes in a combustion chamber.

FIG. 2 shows a cylinder 2 including a piston 3 at the point of ignition during a compression stroke, The ignition spark is generated by the application of the ignition voltage between the stationary center electrode 7 and the mass electrode 9, which is movable with the piston 3. The spark gap 20 between the electrodes 7, 9 extends through the envelope 22 of the conical fuel beam 12, which is generated by a cone spray injection nozzle 14 of an injector 10 injecting fuel directly into the combustion chamber 4. As already described with reference to FIG. 1, the injector is arranged centrally in the combustion chamber top 11. The electrodes 7, 9 are so arranged in the combustion chamber 4 that the free end 17 of the center electrode 7 is disposed on the line 19 of movement of the mass electrode 9. The spark gap length corresponds to the distance between the electrodes and changes proportionally with the piston travel. During partial load operation of the internal combustion engine with relatively small fuel doses a relatively early timing point is selected wherein the spark gap is relatively large—corresponding to the distance of the electrodes from each other. The spark established between the electrodes 7, 9 extends through the envelope 22 of the conical fuel beam 12. With such a long spark, mixture volumina with different air/fuel ratios in the mixture cloud are exposed to the ignition spark. With an ignition voltage which is essentially constant over the whole engine performance graph a relatively large maximum spark gap 20a can be obtained in the lower load range that is during idle engine operation. With an alternating current ignition system (FIG. 1), the maximum spark gap may be up to 10 mm. With such a large spark gap 20a optimal combustion conditions can be provided in the lower load range even with some variations in the cone angle of the fuel cone 12. Consequently, the main factor for a uniform combustion in all cylinders of the internal combustion engine is the uniform fuel injection dosage, which is insured by the direct injection into each combustion chamber 4. The center electrode 7 of each spark plug 6 is disposed within an insulator 8, which extends, together with the center electrode 7, into the combustion chamber 4 such that the free end of the center electrode 7 is electrically insulated with respect to the combustion chamber top 11. The length of the insulator 8 projecting into the combustion chamber 4 is so selected that the distance between the free end 17 of the center electrode 7 and the combustion chamber top 11 is about twice or more of the maximum spark length 20a.

Figure 3:
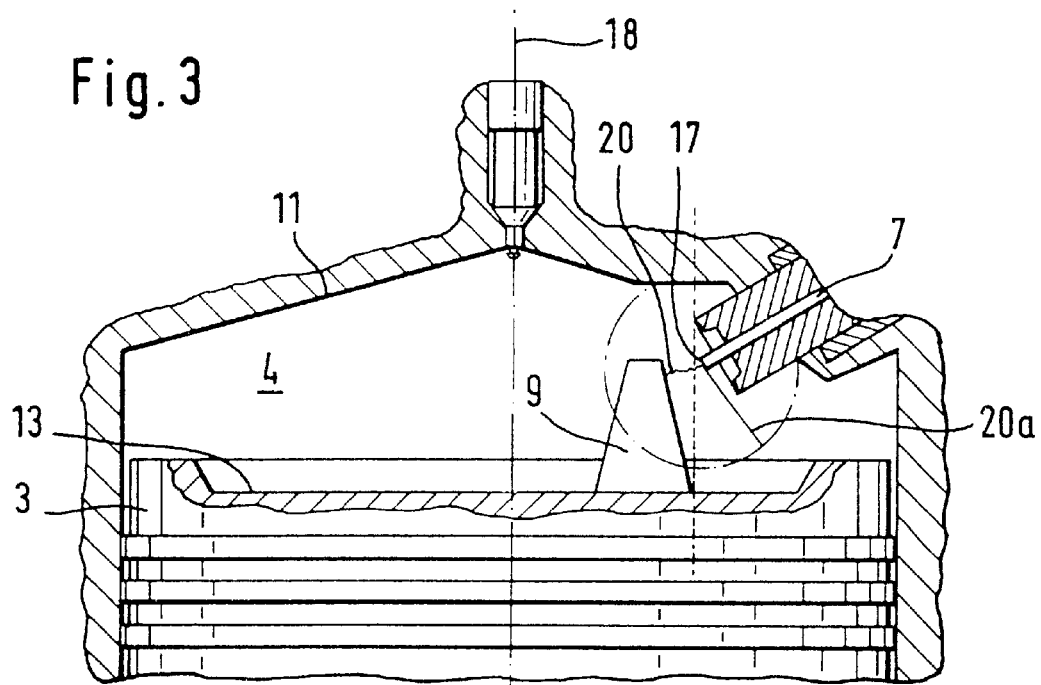

FIG. 3 shows an alternative arrangement for the stationary electrode 7 and the mass electrode 9 movable with the piston 3. The mass electrode 9 is disposed on the piston top 13 at a distance from the cylinder axis 18 radially toward the center electrode 7. In this way, the mass electrode 9 is disposed radially between the cylinder axis 18 and the spark plug 6 such that the path of movement of the mass electrode 9 extends adjacent the free end 17 of the center electrode 7, but at a distance therefrom. In the end phase of the compression stroke of the piston 3, the mass electrode 9 moves therefore past the center electrode 7. Toward the piston top 13, the mass electrode 9 becomes increasingly wider so that the distance between the electrodes becomes smaller as the mass electrode 9 passes by the center electrode 7. With the parallel movement of the mass electrode 9 past the center electrode 7 as shown in FIG. 3 a greater time period is provided for the establishment of an ignition spark than with the arrangement as shown in FIG. 2. With increasingly retarded ignition timing, the spark gap 20 becomes only slightly smaller based on the travel distance of the piston 3. The spark gap 20 may remain essentially constant within a given timing interval that is within a certain angle range of rotation of the crankshaft which is desirable for certain operating points of the internal combustion engine.

The mass electrode 9 is a member projecting from the piston and becoming narrower with increasing distance from the piston top. With its shape adjacent the center electrode 7 where the ignition spark is established the ignition and combustion characteristics of the mixture formed in the combustion chamber 4 can be strongly influenced. Depending on which dependency of the spark gap distance on the ignition timing is desired, the mass electrode 9 may have the shape of a truncated cone or it may have a surface of a second order such as that of hyperboloid or a paraboloid.

Figure 4:
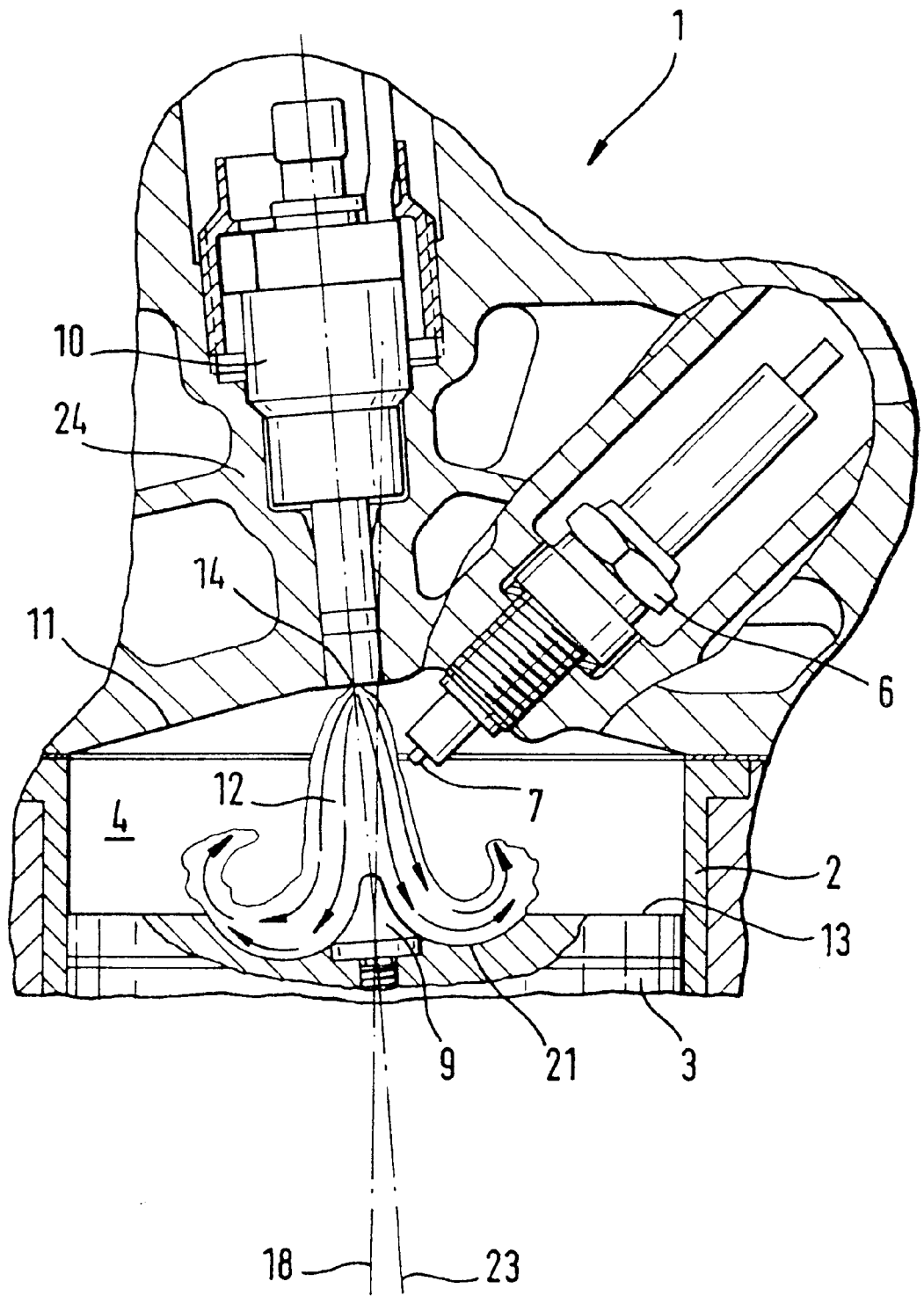
FIG. 4 is a cross-sectional view of a combustion chamber with a configuration of the piston top, which improves combustion of the fuel/air mixture.

FIG. 4 shows a gasoline engine 1 with a piston 3 disposed in a cylinder 2 in a position corresponding to a time during the compression stroke when fuel is injected into the cylinder 2. The opening of the injector 10 is so disposed in the cylinder head 24 that the injection nozzle 14 is disposed about centrally in the combustion chamber top. In order to form a central mixture cloud in the combustion chamber 4, the fuel is injected by the injection nozzle 14 in the form of a conical beam 12 directed toward the piston top 13. In its center, the piston top carries a mass electrode 9 projecting into the combustion chamber and being movable with the piston 3 in the cylinder 2 upwardly toward a center electrode 7 of a spark plug 6, which is firmly mounted onto the combustion chamber top wall 11.

By the application of a certain ignition voltage, an ignition spark is generated between the center electrode 7 and the mass electrode 9 whereby the fuel/air mixture generated in the combustion chamber 4 is ignited.

The fuel beam 12 is intercepted by the upwardly moving piston 3 and is reflected back into the combustion chamber while being atomized and forming a mixture with the air admitted to the combustion chamber 4 through separate intake valves. The mass electrode is disposed in the center of the impingement surface area for the fuel beam 12 and forms, together with a recess 21 formed into the piston top 13 around the mass electrode 9, a radial flow guide structure. The mass electrode 9 is directed toward the injector 10 or rather, the injection nozzle 14 thereof. By its position along the injector axis 23, the mass electrode 9 divides the incoming fuel beam which, when flowing through the curved recess 21, receives an inwardly directed rotational momentum. After flow separation at the outer edge of the recess 21, the fuel is reflected torus-like into the combustion chamber as the rotational impulse given to the flow is maintained. As a result, a central mixture cloud with a low air/fuel ratio is formed, that is, a higher level of fuel concentration is promoted. The mixture to be ignited is kept in the center of the combustion chamber 4 and consequently at a predetermined ignition location adjacent the center electrode 7. Furthermore, the inwardly directed torus-like vortexes effectively prevent fuel deposition on the cylinder wall.

Because of its central location on the pistons 3, the mass electrode 9 is heated during combustion to a high temperature whereby the fuel impinging on the mass electrode 9 is immediately vaporized. Particularly during stratified charge operation of the internal combustion engine, the formation of an ignitable mixture is promoted in this manner. Furthermore, the vaporizing fuel cools the mass electrode and, as a result, reduces knocking tendencies during combustion. During operation of the internal combustion engine with homogeneous mixture formation, that with fuel injection during the suction stroke of the piston 3, the mass electrode 9 can be cooled by a fuel beam directed at the mass electrode before ignition. In this way, an improved combustion condition can be achieved.

In the embodiment according to FIG. 4, the injector axis 23 is slightly inclined with respect to the cylinder axis 18. The injector 10 and the spark plug 6 are arranged in the cylinder head at opposite sides of the cylinder axis 18. As a result, the envelope of the conical fuel beam 12 is disposed at a distance from the center electrode 7 of the spark plug 6. Inspite of the fact that the center electrode 7 projects into the combustion chamber 11 to a point close to the path of movement of the mass electrode 9 (cylinder axis 18) wetting of the center electrode 7 by liquid fuel which would be incompletely burnt is essentially prevented.

What is claimed is:

1. A gasoline internal combustion engine with direct fuel injection, comprising at least one cylinder, a piston movably disposed in said cylinder and delimiting a combustion chamber between said piston and the a cylinder top, a spark plug mounted in said cylinder top and having a center electrode projecting into said combustion chamber, a mass electrode disposed on said piston so as to be movable therewith and projecting therefrom into said combustion chamber, an ignition system for applying an ignition voltage to said center electrode with a timing dependent on the operating point of said internal combustion engine to generate an ignition spark between said center electrode and said mass electrode for igniting a fuel/air mixture in said combustion chamber, and a fuel injector mounted centrally in said cylinder top for injecting fuel directly into said combustion chamber in a symmetrical cone-like beam for generating, with combustion air entering said combustion chamber through an intake valve, a fuel/air mixture which can be readily ignited by said ignition spark, said mass electrode being arranged so as to be directed toward said injector and said piston including in its top a recess extending concentrically around said mass electrode, said mass electrode and said recess forming together a radial deflector for the fuel beam directed by said injector toward said mass electrode.

2. A gasoline internal combustion engine according to claim 1, wherein said ignition system is an alternating current ignition system.

3. A gasoline internal combustion engine according to claim 2, wherein an ignition control is provided which controls the timing for the generation of said ignition spark and the spark duration on the basis of a performance graph depending on at least one operating parameter of said internal combustion engine.

4. A gasoline internal combustion engine according to claim 1, wherein said center electrode is disposed outside said cone-like fuel beam and said mass electrode is disposed within.

5. A gasoline internal combustion engine according to claim 4, wherein said cone-like fuel beam has a cone-shaped beam envelope and said center electrode has a free end disposed adjacent said cone-shaped beam envelope.

6. A gasoline internal combustion engine according to claim 5, wherein the distance between the free end of said center electrode and a wall of the combustion chamber is at least twice a maximum spark distance provided between said electrodes.

7. A gasoline internal combustion engine according to claim 1, wherein said spark plug is mounted in said combustion chamber top in spaced relationship from said injector.

8. A gasoline internal combustion engine with direct fuel injection, comprising at least one cylinder, a piston movably disposed in said cylinder and delimiting a combustion chamber between said piston and the a cylinder top, a spark plug mounted in said cylinder top and having a center electrode projecting into said combustion chamber, a mass electrode disposed on said piston so as to be movable therewith and projecting therefrom into said combustion chamber, said center electrode being disposed in spaced relationship from a line including the path of movement of said mass electrode such that said mass electrode can move past said center electrode, an ignition system for applying an ignition voltage to said center electrode with a timing dependent on the operating point of said internal combustion engine to generate an ignition spark between said center electrode and said mass electrode for igniting a fuel/air mixture in said combustion chamber, and a fuel injector mounted centrally in said cylinder top for injecting fuel directly into said combustion chamber in a symmetrical cone-like beam for generating, with combustion air entering said combustion chamber through an intake valve, a fuel/air mixture which can be readily ignited by said ignition spark, said mass electrode having a shape, which, at its side adjacent said center electrode, becomes increasingly wider toward the bottom such that the distance between said mass electrode and said center electrode decreases as said mass electrode moves past said center electrode.

9. A gasoline internal combustion engine according to claim 8, wherein said ignition system is an alternating current ignition system.

10. A gasoline internal combustion engine according to claim 9, wherein said mass electrode is arranged eccentrically with respect to said cylinder axis such that it is displaced from the cylinder axis toward said center electrode.

11. A gasoline internal combustion engine according to claim 10, wherein said center electrode is disposed in spaced relationship from a line including the path of movement of said mass electrode such that said mass electrode can move past said center electrode.

12. A gasoline internal combustion engine according to claim 9, wherein an ignition control is provided which controls the timing for the generation of said ignition spark and the spark duration on the basis of a performance graph depending on at least one operating parameter of said internal combustion engine.

13. A gasoline internal combustion engine according to claim 9, wherein said center electrode is disposed outside said cone-like fuel beam and said mass electrode is disposed within.

14. A gasoline internal combustion engine according to claim 13, wherein said cone-like fuel beam has a cone-shaped beam envelope and said center electrode has a free end disposed adjacent said cone-shaped beam envelope.

* * * * *